(12) United States Patent
Kröger

(10) Patent No.: US 9,308,794 B2
(45) Date of Patent: Apr. 12, 2016

(54) AIR SPRING

(71) Applicant: Continental Teves AG & Co. oHG, Frankfurt (DE)

(72) Inventor: Dirk Kröger, Hannover (DE)

(73) Assignee: Continental Teves AG & Co. oHG (DE)

( * ) Notice: Subject to any disclaimer, the term of this patent is extended or adjusted under 35 U.S.C. 154(b) by 33 days.

(21) Appl. No.: 14/357,864

(22) PCT Filed: Nov. 8, 2012

(86) PCT No.: PCT/EP2012/072094
§ 371 (c)(1),
(2) Date: Sep. 8, 2014

(87) PCT Pub. No.: WO2013/072241
PCT Pub. Date: May 23, 2013

(65) Prior Publication Data
US 2014/0374972 A1    Dec. 25, 2014

(30) Foreign Application Priority Data
Nov. 15, 2011   (DE) .......................... 10 2011 086 353

(51) Int. Cl.
| | |
|---|---|
| *F16F 9/04* | (2006.01) |
| *B60G 11/62* | (2006.01) |
| *F16F 9/05* | (2006.01) |
| *B60G 17/052* | (2006.01) |

(52) U.S. Cl.
CPC ............ *B60G 11/62* (2013.01); *B60G 17/0521* (2013.01); *F16F 9/0454* (2013.01); *F16F 9/057* (2013.01)

(58) Field of Classification Search
CPC ............... F16F 9/08; F16F 9/05; F16F 9/057; F16F 9/36; F16F 9/3214; F16F 9/0454; F16F 9/54; B60G 11/62; B60G 11/27; B60G 17/0521; B60G 2202/152; B60G 2202/242; B60G 2204/126; B60G 2204/1262
See application file for complete search history.

(56) References Cited

U.S. PATENT DOCUMENTS

| | | | | |
|---|---|---|---|---|
| 4,787,606 A | * | 11/1988 | Geno | .................... F16F 9/0463 267/64.24 |
| 5,509,641 A | * | 4/1996 | Prinzler | ................ B60G 15/10 267/64.19 |

(Continued)

FOREIGN PATENT DOCUMENTS

| | | |
|---|---|---|
| DE | 195 08 980 | 6/1996 |
| DE | 199 08 607 | 9/2000 |

(Continued)

OTHER PUBLICATIONS

International Search Report corresponding to application No. PCT/EP2012/072094, dated Feb. 21, 2013.

(Continued)

*Primary Examiner* — Pamela Rodriguez
(74) *Attorney, Agent, or Firm* — RatnerPrestia

(57) ABSTRACT

A vehicle air spring with an elastomer material air-tight tensioned air spring bellows arranged between an air spring cover and rolling piston. The air spring bellows delimiting, with the air spring cover and the air spring rolling piston, a working chamber filled with compressed air. The air spring bellows rolling away under formation of a rolling fold on the air spring rolling piston and fastening to the air spring cover under formation of a second fold, and having an elastomer element provided as an anti-roughness bearing. The elastomer element is arranged between a first and second piston part of the air spring rolling piston, the second part arranged coaxially to the first. The rolling surface for the air spring bellows is provided on the first piston part and on which the air spring bellows is fastened by a clamping element. The second piston part is mountable on a vehicle chassis.

4 Claims, 5 Drawing Sheets

(56) References Cited

U.S. PATENT DOCUMENTS

| | | | |
|---|---|---|---|
| 5,667,203 | A | 9/1997 | Römer |
| 6,116,584 | A | 9/2000 | Römer |
| 8,272,627 | B2 | 9/2012 | Oldenettel |
| 2015/0035213 | A1* | 2/2015 | Stahmer .................. F16F 9/057 267/64.27 |

FOREIGN PATENT DOCUMENTS

| | | |
|---|---|---|
| DE | 102004033199 | 2/2006 |
| DE | 102006052314 | 5/2008 |
| DE | 102008026219 | 12/2009 |
| DE | 102008050604 | 4/2010 |
| DE | 2010 017 227 | 12/2011 |
| EP | 1 614 928 | 1/2006 |
| WO | WO-2007/104671 A1 * | 9/2007 |

OTHER PUBLICATIONS

International Preliminary Report on Patentability and translation of the Written Opinion of the International Searching Authority for PCT/EP2012/072094, isused May 20, 2014.

* cited by examiner

AIR SPRING

CROSS REFERENCE TO RELATED APPLICATIONS

This application is the U.S. National Application of PCT International Application No. PCT/EP2012/072094, filed Nov. 8, 2012, which claims priority to German Patent Application No. 10 2011 086 353.2, filed Nov. 15, 2011, the contents of such applications being incorporated by reference herein.

FIELD OF THE INVENTION

The invention relates to an air spring for vehicles, having an air spring bellows made of elastomeric material clamped in an airtight manner between an air spring cover and an air spring rolling piston, which air spring bellows delimits with the air spring cover and the air spring rolling piston a working chamber filled with compressed air, rolls on the air spring rolling piston while forming a rolling fold and is fastened to the air spring cover while forming a second fold, and having an elastomeric element which is provided as an anti-harshness mount.

BACKGROUND OF THE INVENTION

Air springs which are mounted between running gear and vehicle body and have an air spring bellows which in turn is fastened between an air spring cover and a rolling piston are known in a large number of configurations. In operation, the air spring is subjected to an internal overpressure. The air spring bellows rolls on the outer contour of the concentric air spring piston/rolling piston under load and in the course of spring movements while forming a rolling fold. An air spring of this type is frequently used in road or rail vehicles in order to achieve a comfortable suspension.

So-called "anti-harshness mounts" are increasingly called for in order to improve the suspension comfort of the air spring in the vehicle. Harshness is understood to mean a superposed, rough and hard behavior of the suspension in the case of oscillations of relatively high frequency and relatively small amplitude, which in the case of air springs or air spring and damper units is dependent on the working pressure applied and on the mountings between the components and the vehicle body.

An air spring having an anti-harshness mount is known, for example, from DE 102010017227 A1, which is incorporated by reference, the mount being provided as an elastomeric element between an upper cover part and a lower cover part.

Especially in the case of modern vehicles in which, because of the limited installation space available, it is often necessary to install the air springs upside-down and without integrated dampers, this arrangement considerably restricts the axial installation space, or the elastomeric element is not aligned optimally with respect to the effective diameter of the air spring.

SUMMARY OF THE INVENTION

An aspect of the invention provides an air spring for vehicles which makes possible an optimized installation space for a self-contained air spring, especially in the upside-down position with anti-harshness mount. In addition, the effectiveness of the mount with regard to ride comfort is to be optimized.

This is achieved according to the invention in that the elastomeric element is arranged between a first piston part and a second piston part, coaxial therewith, of the air spring rolling bellows, the rolling surface for the air spring bellows being provided on the first piston part and the air spring bellows being fastened by means of a clamping element, and the second piston part being mountable on a mounting surface of a vehicle body. Through the positioning of the anti-harshness mount in the air spring rolling piston a substantially shortened axial installation height of the air spring can be achieved in the upside-down position, in comparison to known air springs. Furthermore, through the proximity to the vehicle body, the arrangement of the anti-harshness mount in the air spring rolling piston allows a more direct effect on comfort.

According to an advantageous embodiment of the invention, the elastomeric element as the anti-harshness mount may be made of rubber and may be vulcanized between the two piston parts, whereby simple manufacture is achieved.

According to an advantageous development of the invention, the first piston part is formed in two parts with a first and a second component, the first component being provided to fasten the air spring bellows and the rolling surface being arranged on the second component. It is advantageous in this case that the rolling contour of the piston can be exchanged, so that the characteristic of the air spring can be changed in the context of ride tuning.

The second component preferably has a radially inwardly oriented step which, for fastening to the first component, engages in a recess on an outer side of the first component, whereby the rolling contour of the piston can be exchanged in a simple manner.

According to an advantageous embodiment, the elastomeric element is made of rubber and is vulcanized between two annular elements which are arranged between the second piston part and the first component of the first piston part.

If the air spring has at least one further working chamber separated from the working chamber by means of a dividing wall and an on-off valve, according to an advantageous embodiment of the invention the second piston part can be formed in three parts, the on-off valve being arranged between a first component provided as the dividing wall and a second component, which first and second components are connected to one another in a sealed manner, and a third component connected to the second component being provided for fastening to the mounting surface of the vehicle body.

The first and second components may preferably be connected to one another in a sealed manner by means of a threaded connection.

BRIEF DESCRIPTION OF THE DRAWINGS

Further features, advantages and applications of the invention are apparent from the dependent claims and from the following description of exemplary embodiments, and from the drawing in which, in a highly schematized form and in cross section in each case:

DETAILED DESCRIPTION OF THE PREFERRED EMBODIMENTS

Figure 1:
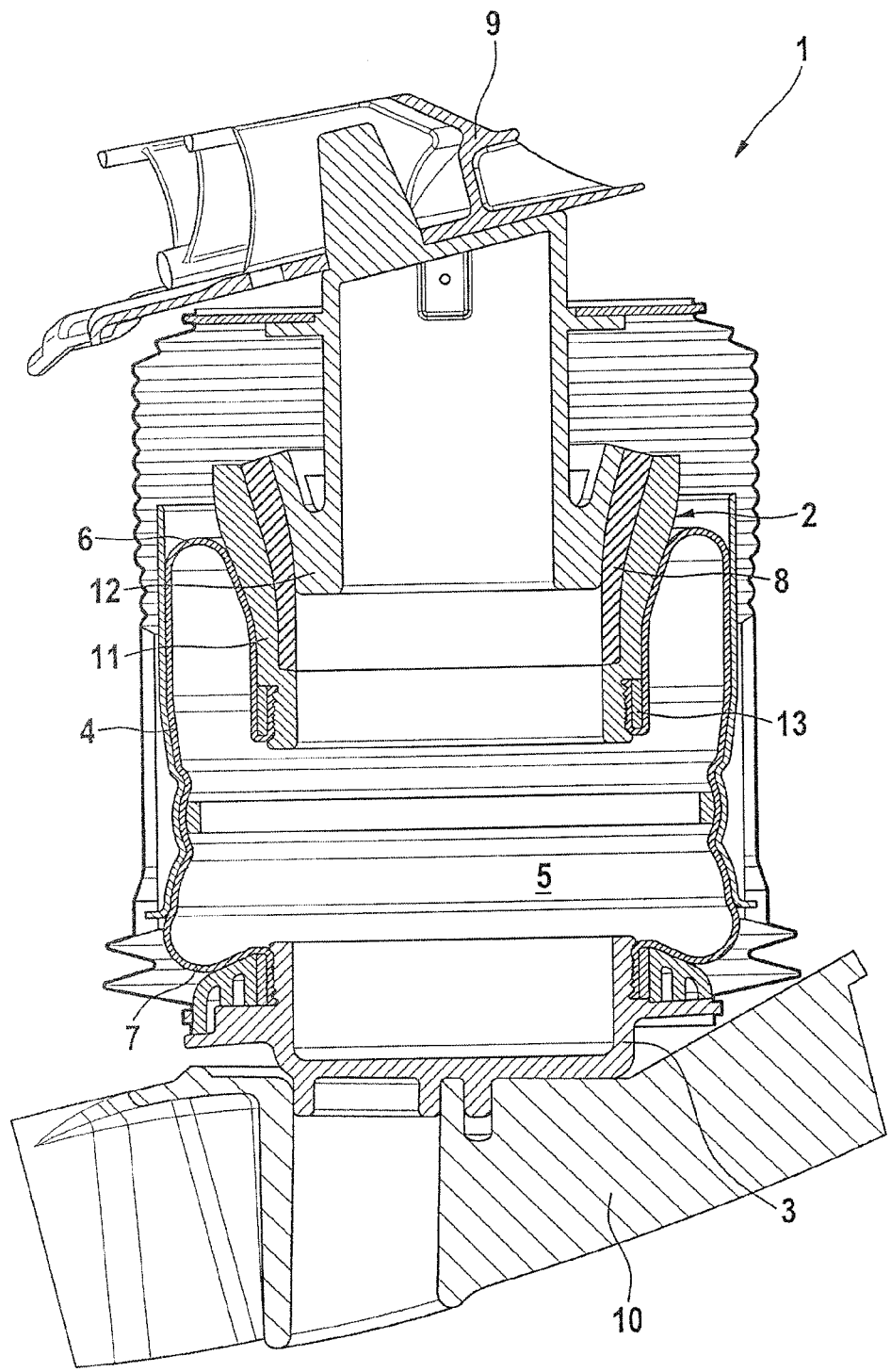
FIG. 1 shows a first exemplary embodiment of an air spring according to the invention in an upside-down position.
Figure 2:
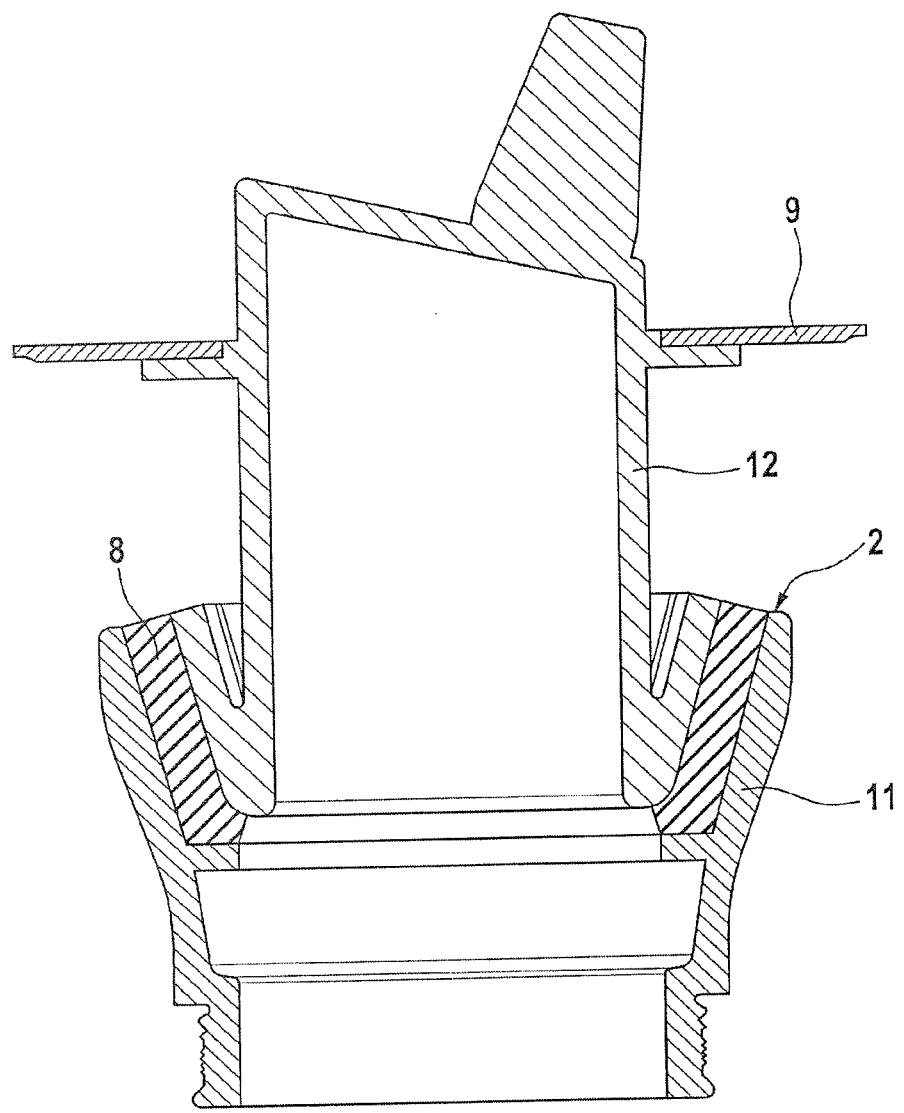
FIG. 2 shows an air spring rolling piston of the air spring according to FIG. 1.

FIG. 1 shows a first exemplary embodiment of an air spring 1 in the installed state in a vehicle, while FIG. 2 shows an enlarged air spring rolling piston 2 of the air spring 1 represented in FIG. 1.

The air spring 1 has an air spring bellows 4 made of elastomeric material which is clamped in an airtight manner between an air spring cover 3 and the air spring rolling piston 2 and delimits, with the air spring cover 3 and the air spring rolling piston 2, a working chamber 5 filled with compressed air. The air spring bellows 4 rolls on the air spring rolling piston 2 while forming a rolling fold 6 and is fastened to the air spring cover 2 while forming a second fold 7.

An elastomeric element 8, which improves the suspension comfort of the air spring 1 in the vehicle, is provided as an anti-harshness mount. Harshness is understood to mean a superposed, rough and hard suspension behavior in the event of oscillations of relatively high frequency and relatively small amplitude, which in the case of air springs or air spring and damper units is dependent on the applied working pressure and on the mountings between the components and the vehicle body.

In modern vehicles it is therefore often necessary, because of the small available installation space, to install an air spring without integrated damper in the so-called upside-down position, in which the air spring rolling piston is supported on the vehicle body 9 and the air spring cover is mounted underneath, for example on a suspension arm 10 of an axle. This arrangement permits improved compensation of the axle kinematics but considerably restricts the axial installation space, or, with known air springs, an elastomeric element is not aligned optimally with respect to the effective diameter of the air spring.

In order to optimize the installation space and the effectiveness of the anti-harshness mount with regard to the ride comfort of the air spring 1, the elastomeric element 8 is arranged between a first piston part 11 and a second piston part 12, coaxial therewith, of the air spring rolling piston 2. In this exemplary embodiment the elastomeric element 8 as the anti-harshness mount is made of rubber and is vulcanized between the two piston parts 11, 12, allowing simple manufacture.

In this case the rolling surface for the air spring bellows 4 is provided on the first piston part 11 and the air spring bellows 4 is fastened to the first piston part 11 by means of a clamping element 13. The second piston part 12 can be mounted on a mounting surface of the vehicle body 9.

Figure 3:
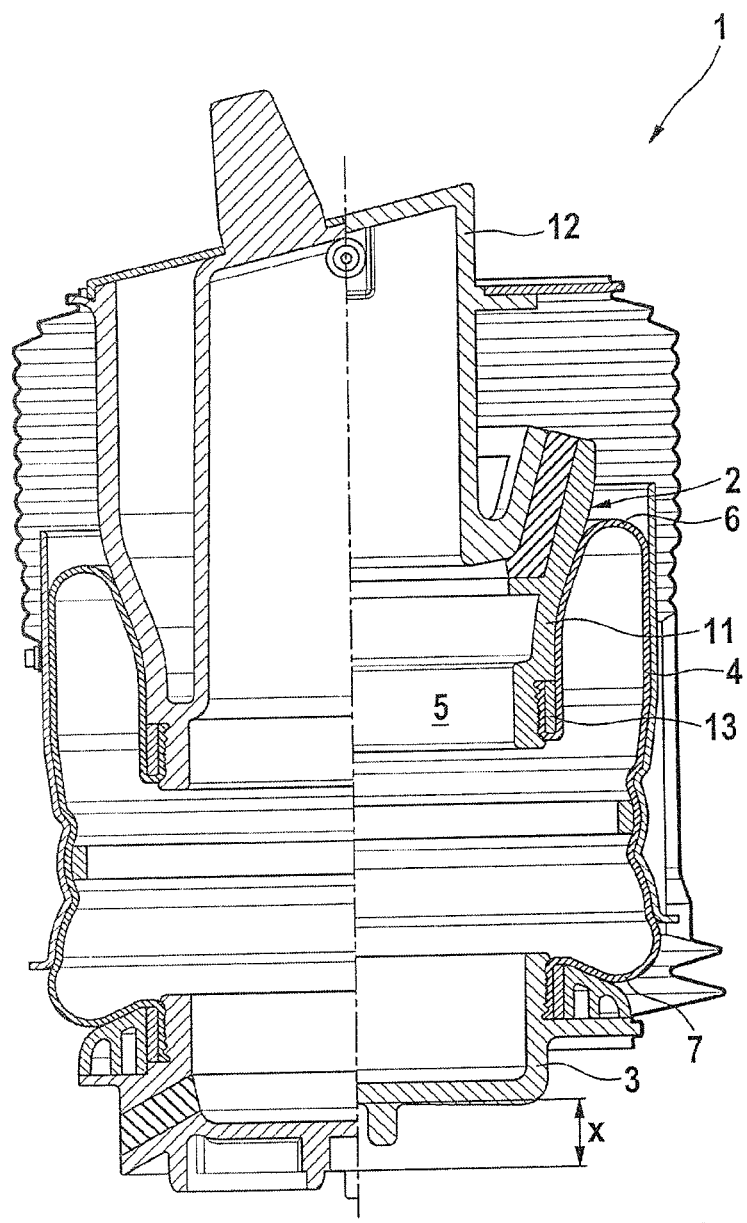
FIG. 3 shows a comparison between a known air spring and the air spring according to the invention as shown in FIGS. 1 and 2 in an upside-down position.

FIG. 3 shows a comparison between a known air spring in the left-hand half and the air spring 1 according to the invention in an upside-down position in the right-hand half. It can be clearly seen that, through the positioning of the anti-harshness mount in the air spring rolling piston 2, a shortening of the axial installation height of the air spring 1 by an amount x can be achieved. Furthermore, because of the positioning closer to the vehicle body 9, the arrangement of the anti-harshness mount in the air spring rolling piston 2 allows a more direct effect on comfort.

Figure 4:
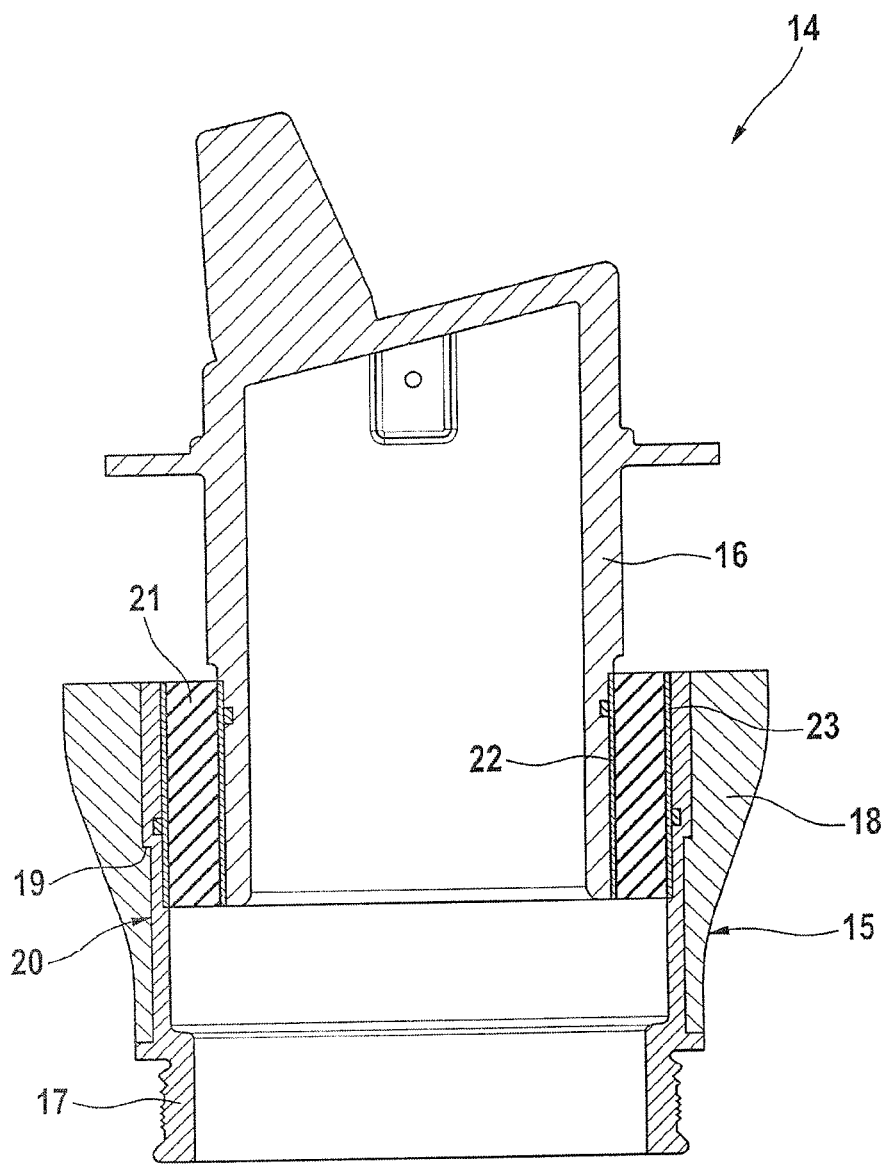
FIG. 4 shows an air spring rolling piston of a second exemplary embodiment of an air spring according to the invention.

An air spring rolling piston 14 of a second exemplary embodiment of an air spring according to the invention can be seen in FIG. 4. A first piston part 15 of the air spring rolling piston 14 is formed in two parts, with a first and a second component 17, 18. The first component 17 is provided for fastening the air spring bellows 4 and the rolling surface is arranged on the second component 18.

For fastening to the first component 17, the second component 18 has a radially inwardly oriented step 19 which engages in a recess 20 on an outer side of the first component 17.

It can further be seen in FIG. 4 that the elastomeric element 21 provided as the anti-harshness mount is made of rubber and is vulcanized between two annular elements 22, 23, which are arranged between the second piston part 16 and the first component 17 of the first piston part 15, into which they are press-fitted.

In this exemplary embodiment both the anti-harshness mount and the rolling contour of the air spring rolling piston 14 can be exchanged in a simple manner, whereby the characteristic of the air spring can be changed in the context of ride tuning.

Figure 5:
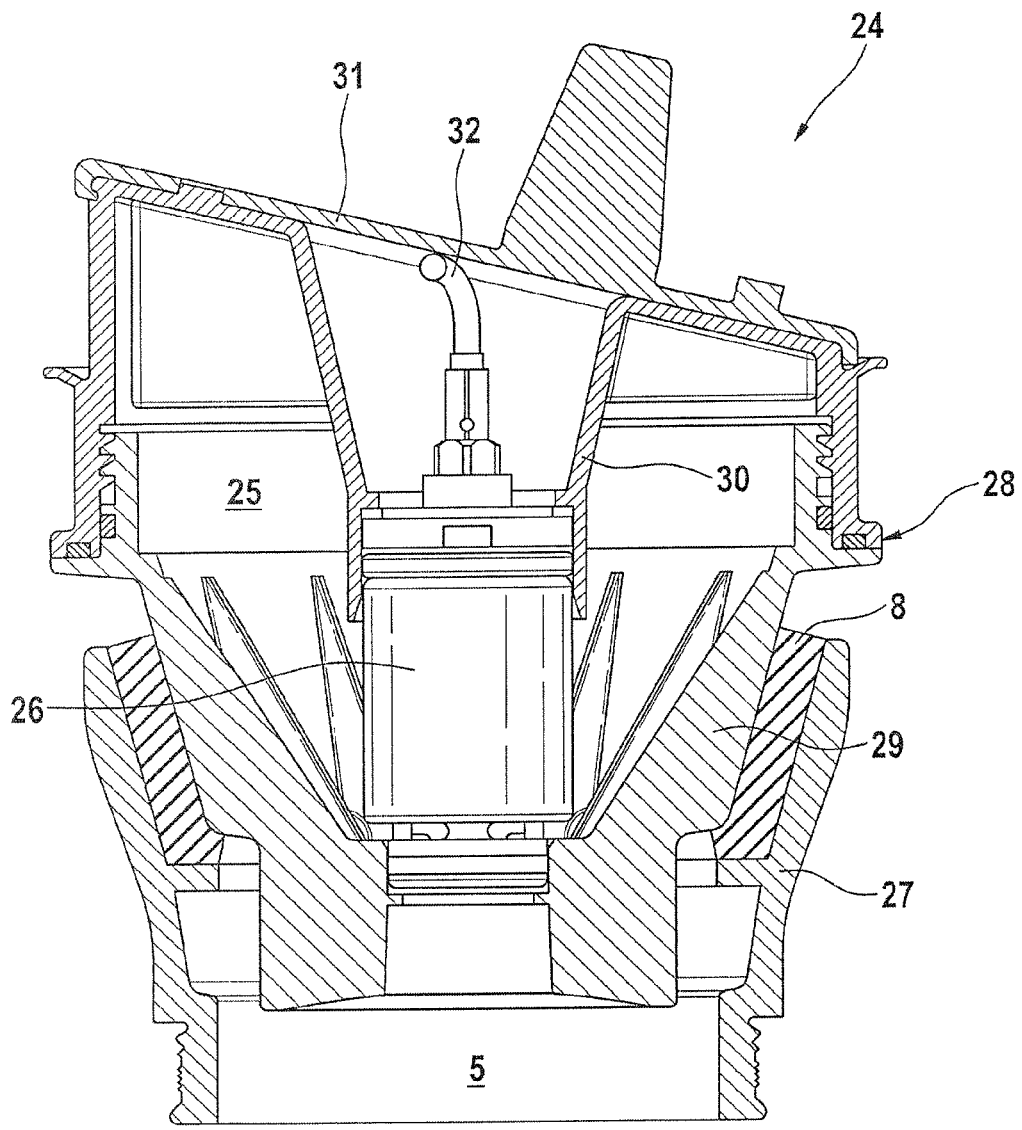
FIG. 5 shows an air spring rolling piston of a third exemplary embodiment of an air spring according to the invention.

In order to change the stiffness of the air spring, the air spring may have at least one further working chamber 25, as shown in FIG. 5, which shows an air spring rolling piston 24 of a third exemplary embodiment with a first and a second piston part 27, 28.

The further working chamber 25 is separated from the working chamber 5 by means of a dividing wall and an on-off valve 26. The second piston part 28 is formed in three parts, the on-off valve 26 being arranged between a first component 29 provided as the dividing wall and a second component 30, which components 29, 30 are connected to one another in a sealed manner. A third component 31, which is in turn connected to the second component 30, is provided for fastening to the mounting surface of the vehicle body 9 and allows a connecting cable 32 of the on-off valve 26 to exit in a simple manner.

As can be seen in FIG. 5, the first and second components 29, 30 are connected to one another in a sealed manner by means of a threaded connection, although this connection may also be implemented by means of other types of connection.

LIST OF REFERENCES

1 Air spring
2 Air spring rolling piston
3 Air spring cover
4 Air spring bellows
5 Working chamber
6 Rolling fold
7 Fold
8 Elastomeric element
9 Vehicle body
10 Suspension arm
11 First piston part
12 Second piston part
13 Clamping element
14 Air spring rolling piston
15 First piston part
16 Second piston part
17 First component
18 Second component
19 Step
20 Recess
21 Elastomeric element
22 Annular element
23 Annular element 24 Air spring rolling piston
25 Working chamber
26 On-off valve
27 First piston part
28 Second piston part
29 First component
30 Second component
31 Third component
32 Connecting cable

The invention claimed is:

1. An air spring for vehicles, having an air spring bellows made of elastomeric material clamped in an airtight manner between an air spring cover and an air spring rolling piston, which air spring bellows delimits with the air spring cover and the air spring rolling piston a working chamber filled with compressed air, rolls on the air spring rolling piston while forming a rolling fold and is fastened to the air spring cover while forming a second fold, and having an elastomeric element which is provided as an anti-harshness mount, wherein the elastomeric element is arranged between a first piston part and a second piston part, coaxial therewith, of the air spring rolling piston, the first piston part and the second piston part being separate structures that are coupled together by way of the elastomeric element, the first piston part having a radially-inward facing surface and the second piston part having a radially-outward facing surface with the elastomeric element extending from the radially-inward facing surface of the first piston part to the radially-outward facing surface of the second piston part, the rolling surface for the air spring bellows being provided opposite the radially-inward facing surface on the first piston part and the air spring bellows being fastened by means of a clamping element, and the second piston part being mountable on a mounting surface of a vehicle body,
   wherein the elastomeric element is made of rubber and is vulcanized between the two piston parts; and
   wherein the first piston part is formed in two parts with a first and a second component, the first component being provided for fastening the air spring bellows and the rolling surface being arranged on the second component.

2. The air spring as claimed in claim 1, wherein the second component has a radially inwardly oriented step which, for fastening to the first component, engages in a recess on an outer side of the first component.

3. An air spring for vehicles, having an air spring bellows made of elastomeric material clamped in an airtight manner between an air spring cover and an air spring rolling piston, which air spring bellows delimits with the air spring cover and the air spring rolling piston a working chamber filled with compressed air, rolls on the air spring rolling piston while forming a rolling fold and is fastened to the air spring cover while forming a second fold, and having an elastomeric element which is provided as an anti-harshness mount, wherein the elastomeric element is arranged between a first piston part and a second piston part, coaxial therewith, of the air spring rolling piston, the first piston part and the second piston part being separate structures that are coupled together by way of the elastomeric element, the rolling surface for the air spring bellows being provided on the first piston part and the air spring bellows being fastened by means of a clamping element, and the second piston part being mountable on a mounting surface of a vehicle body,
   wherein the elastomeric element is made of rubber and is vulcanized between the two piston parts,
   wherein the first piston part is formed in two parts with a first and a second component, the first component being provided for fastening the air spring bellows and the rolling surface being arranged on the second component, and
   wherein the elastomeric element is vulcanized between two annular elements which are arranged between the second piston part and the first component of the first piston part.

4. An air spring for vehicles, having an air spring bellows made of elastomeric material clamped in an airtight manner between an air spring cover and an air spring rolling piston, which air spring bellows delimits with the air spring cover and the air spring rolling piston a working chamber filled with compressed air, rolls on the air spring rolling piston while forming a rolling fold and is fastened to the air spring cover while forming a second fold, and having an elastomeric element which is provided as an anti-harshness mount, wherein the elastomeric element is arranged between a first piston part and a second piston part, coaxial therewith, of the air spring rolling piston, the first piston part and the second piston part being separate structures that are coupled together by way of the elastomeric element, the rolling surface for the air spring bellows being provided on the first piston part and the air spring bellows being fastened by means of a clamping element, and the second piston part being mountable on a mounting surface of a vehicle body,
   wherein the elastomeric element is made of rubber and is vulcanized between the two piston parts,
   wherein the first piston part is formed in two parts with a first and a second component, the first component being provided for fastening the air spring bellows and the rolling surface being arranged on the second component,
   wherein the second component has a radially inwardly oriented step which, for fastening to the first component, engages in a recess on an outer side of the first component, and
   wherein the elastomeric element is vulcanized between two annular elements which are arranged between the second piston part and the first component of the first piston part.

\* \* \* \* \*